F. CONRAD & P. MacGAHAN.
RECORDING MEASURING INSTRUMENT.
APPLICATION FILED MAR. 23, 1906. RENEWED JUNE 15, 1911.

1,031,041.

Patented July 2, 1912.

3 SHEETS—SHEET 1.

WITNESSES:
Fred H. Miller
Otto S. Schairer

INVENTORS
Frank Conrad
& Paul MacGahan
BY
Feeley S. Carr
ATTORNEY

F. CONRAD & P. MacGAHAN.
RECORDING MEASURING INSTRUMENT.
APPLICATION FILED MAR. 23, 1906. RENEWED JUNE 15, 1911.

1,031,041.

Patented July 2, 1912.
3 SHEETS—SHEET 2.

WITNESSES:
Fred H. Miller
Otto J. Schairer

INVENTORS
Frank Conrad
& Paul MacGahan
BY
Kelley G. Carr
ATTORNEY

UNITED STATES PATENT OFFICE.

FRANK CONRAD, OF SWISSVALE, AND PAUL MacGAHAN, OF WILKINSBURG, PENNSYLVANIA, ASSIGNORS TO WESTINGHOUSE ELECTRIC & MANUFACTURING COMPANY, A CORPORATION OF PENNSYLVANIA.

RECORDING MEASURING INSTRUMENT.

1,031,041. Specification of Letters Patent. Patented July 2, 1912.

Application filed March 23, 1906, Serial No. 307,738. Renewed June 15, 1911. Serial No. 633,347.

*To all whom it may concern:*

Be it known that we, FRANK CONRAD and PAUL MacGAHAN, citizens of the United States, and residents, respectively, of Swissvale and of Wilkinsburg, in the county of Allegheny and State of Pennsylvania, have invented a new and useful Improvement in Recording Measuring Instruments, of which the following is a specification.

Our invention relates to electrical measuring instruments and it has for its object to provide such instruments with means whereby an accurate, continuous record may be made of the values of the forces measured without impairing the sensitiveness of the instrument to which the means are applied.

Figure 1:
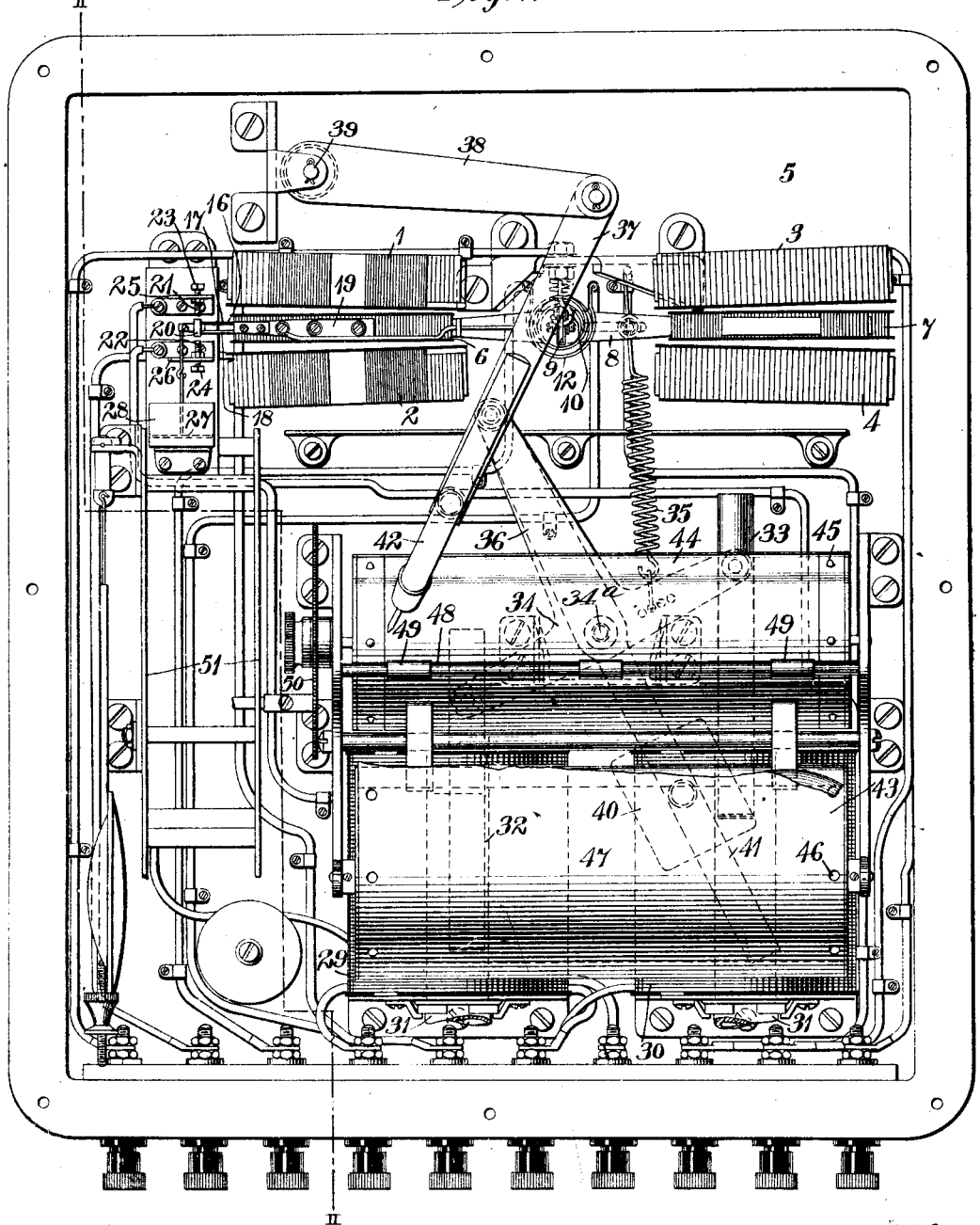
Figure 2:
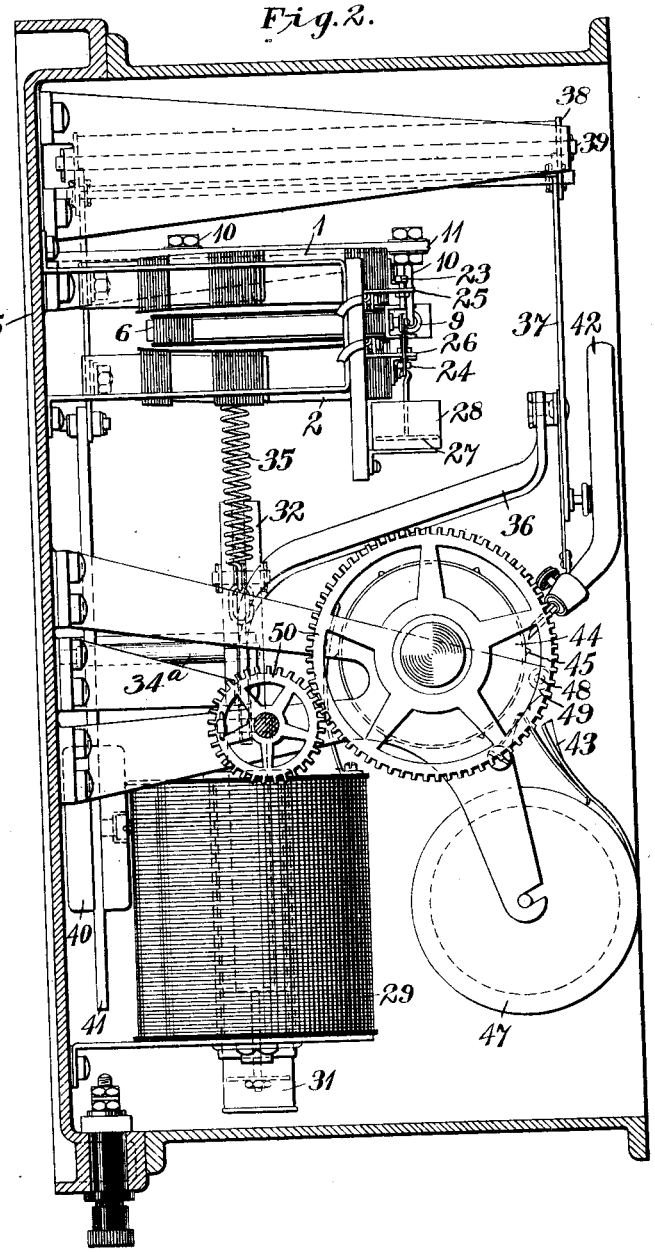
Figure 3:
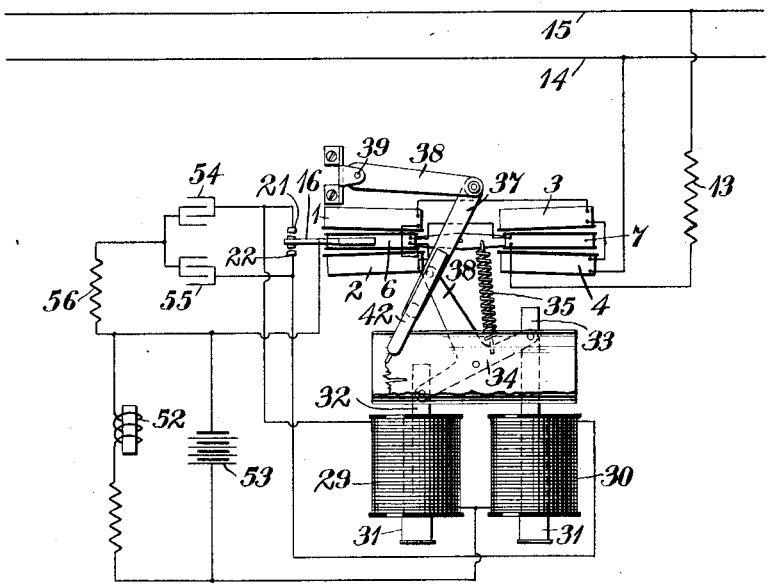
Figure 4:
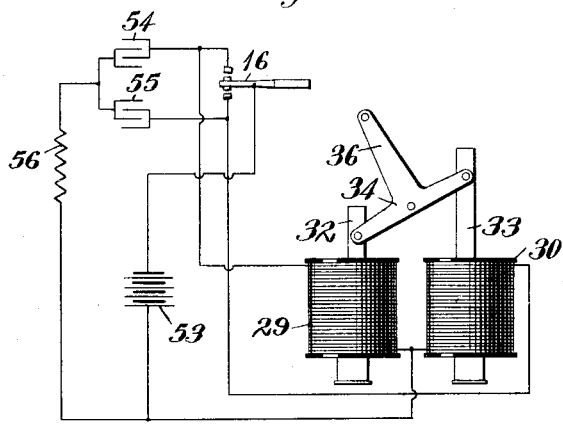

Figure 1 of the accompanying drawings is a view, in front elevation of an instrument that is constructed in accordance with our invention. Fig. 2 is a view in side elevation and in section on the line II—II of Fig. 1. Fig. 3 is a diagrammatic view illustrating the circuit connections of the instrument, and Fig. 4 is a diagrammatic view of a modification of the circuits of Fig. 3.

An instrument to which our invention may be conveniently applied is of the dynamometer type and comprises a set of coils 1, 2, 3 and 4 that are arranged in pairs and are immovably secured to a base or back plate 5 and two other coils 6 and 7 that are movable between the opposing faces of the respective pairs of stationary coils. The coils 6 and 7 are carried at the opposite ends of a frame 8 that is pivotally supported upon knife edged bearings 9 by means of hooks 10 that depend from a stationary bracket 11. Circuit connections to the movable coils 6 and 7 may be made by means of a pair of oppositely coiled spiral springs 12, as is usual in instruments of this character. It will be readily understood that the coils may be so constructed and the circuits thereof be so arranged that the instrument may be adapted for operation as a voltmeter, an ammeter or a wattmeter, as desired. In order to illustrate the mode of operation of the invention, however, it has been applied in Fig. 3 to a voltmeter, all of the coils being connected in series with a resistance 13 and between a pair of circuit conductors 14 and 15.

The movable member of the instrument carries a flexible switch member 16 comprising a pair of resilient strips 17 and 18, that are spaced apart and are secured at one end to a terminal plate 19 on the edge of the coil 6. The free end of the switch member is provided with a contact piece 20 that is preferably composed of silver and is adapted to be brought into engagement with the one or the other of a pair of stationary contact terminals 21 and 22 by the movements of the movable member. The contact terminals 21 and 22 comprise screws 23 and 24 that are threaded in stationary posts or brackets 25 and 26, the tips or contact surfaces of the screws being preferably composed of platinum. It has been found by experiment that, when the engaging surfaces of a circuit interrupting device are composed respectively of silver and platinum, or other dissimilar metals of substantially the same properties, sticking and welding of the parts will be substantially obviated. Attached to the free end of the switch member 16 is a piston or movable member 27 of a retarding device, that comprises further a cylinder or receptacle 28 containing oil or other suitable liquid in which the member 27 is adapted to operate. By this means vibration or buzzing of the contact terminals which would otherwise occur when the instrument is employed in connection with alternating current is substantially obviated while at the same time undue oscillations and sudden movements of the parts are prevented.

The brackets 25 and 26 are respectively connected to terminals of non-magnet windings 29 and 30 that surround magnetizable receptacles 31, containing oil or other suitable liquid in which magnetizable cores 32 and 33 are adapted to operate, the movements of the cores and connected parts being in this manner effectively damped and retarded. The cores 32 and 33 are carried at the opposite ends of a rocking beam 34 that is supported upon a pivot 34ª and is connected, by means of a helical spring 35, to the frame 8, the spring being of sufficient strength to balance the torques exerted between the stationary and movable coils 1, 2, 3, 4, 6 and 7 but not of sufficient strength to overcome the static friction of and move the rocking beam 34 and connected parts. The spring 35 is not under tension when the parts with which it is connected occupy the positions shown in Fig. 1. An arm 36, that extends upwardly from the rocking beam, is pivoted at its outer end to the middle or other point of a link 37 that, in turn, is pivoted at its upper end to another lever 38 having a stationary pivot at 39. The movable parts 36, 37, 38 and 42 of the mechanism are balanced, so that they will remain in any position to which they are moved, by means of a weight 40 that is adjustable in position on an arm 41 which extends downwardly from the rocking beam 34. A fountain pen 42 or other suitable means for effecting a record, such as a pencil, is carried at the lower end of the link 37 and engages a record strip 43 upon the face of a platen roll 44, the parts of the link and lever mechanism being so proportioned and disposed with reference to each other that the pen will be caused to move in a straight line across the face of the platen roll. The platen roll is provided at its ends with projections 45 that are adapted to register with apertures 46 near the edges of the record strip, which is thereby drawn from a supply roll 47. An idle roll or spindle 48, that is provided at intervals with rubber or other resilient sleeves 49, serves to press the record strip tightly against the face of the platen roll. The platen roll is adapted to be operated through intermediate gearing 50 by means of a suitable self-winding clock the works of which are mounted in a frame 51, a magnet winding 52 serving to wind or to control the winding of the clock. Since the details of the clock mechanism form no part of the present invention, and since such clocks are well known in the art, it is deemed unnecessary to further show its structure or describe its mode of operation.

When no current traverses the instrument coils 1, 2, 3, 4, 6 and 7, the parts occupy the positions shown in Fig. 1, and the spring 35 is not under tension. However, when current traverses the said windings, the force exerted between the stationary and movable coils will cause the coil 6 to move downwardly and the coil 7 upwardly and the contact piece 20 on the switch arm 16 will be thereby brought into engagement with the stationary terminal 22 so as to complete the circuit of the magnet winding 30. As here shown, the auxiliary circuits of the instrument are supplied from a battery 53, though they may be supplied from any other suitable source, such as from the exciters for generators, in connection with which the instrument may be employed. Energizing of the magnet winding 30 causes the core 33 to be drawn downwardly and the fountain pen to be moved toward the right until the tension exerted upon the spring 35 equals the torque exerted between the stationary and movable coils. The contact piece 20 on the switch arm 16 will thereupon be disengaged from the stationary terminal 22 and the parts of the instrument will remain stationary so long as the forces exerted between the stationary and the movable coils do not vary except that the platen roll will be moved by the clock mechanism so that a line may be made on the strip 43 as it is moved under the pen point. If the voltage of the circuit increases, the contact piece 20 will be again moved into engagement with the stationary terminal 22 and, as a result, the recording device will be moved farther to the right, but if the voltage of the circuit decreases the contact piece 20 will be moved into engagement with the stationary terminal 21 and thereupon establish the circuit of the magnet winding 29. This will cause the recording device to be moved to the left until the tension exerted upon the spring 35 is reduced to correspond to the torque exerted between the stationary and movable coils. Thus a continuous record of the values of the forces measured will be made upon the strip 43, and since the recording mechanism is not operated directly by the movable member of the instrument the sensitiveness of the latter is not impaired by the presence of the recording means.

In order to reduce or substantially prevent sparking caused by the inductive discharges of the magnet windings 29 and 30 when the circuits thereof are interrupted, condensers 54 and 55 are so arranged in circuit with a resistance 56 that whenever the circuit is interrupted the break will be shunted by one of the condensers and the resistance, as shown in Fig. 3. In some instances, however, it may be desirable to arrange the circuits as shown in Fig. 4, in which the magnet windings are shunted respectively by one of the condensers and the resistance. It has been found, when either the condensers or the resistance are employed alone to reduce the effects of inductive discharges, that a certain amount of sparking may occur between the disengaging parts, while if both devices are employed it will be substantially obviated. The condenser delays and absorbs the discharge while the resistance reduces the amount of current and the voltage of the discharge.

While the invention has been shown and described as applied to a particular form of instrument it will be understood that it is applicable broadly to all forms having movable members and specifically to other instruments of the dynamometer type. In another application Serial No. 307,739 filed of even date herewith we have shown a modification of the present invention in which recording means are applied to an instrument of the indicating type; that is, an instrument in which the movements of the movable member are proportional in extent to the values of the forces measured.

We claim as our invention:

1. A measuring instrument comprising a movable member, a recording mechanism, solenoids and cores for actuating the same, means operated by the movable member for controlling the circuits of the solenoids and resilient means connecting the recording mechanism and the movable member.

2. A measuring instrument comprising a movable member, a contact terminal carried thereby, a recording mechanism, solenoids and cores for actuating the same, contact terminals which coöperate with that carried by the movable member to control the circuits of the solenoids, and resilient means connecting the recording mechanism and the movable member.

3. A measuring instrument comprising a movable member, a switch member carried thereby, a recording mechanism, magnet windings for actuating the same, contact terminals disposed in the path of movement of the switch member to coöperate therewith in controlling the circuits of the solenoids, means for adjusting the positions of the contact terminals, and resilient means connecting the recording mechanism and the movable member.

4. A measuring instrument comprising a movable member, a parallel-motion recording mechanism, solenoids and cores for actuating the same, and means operated by the movable member for controlling the circuits of the solenoids.

5. A measuring instrument comprising a movable member, a parallel-motion recording mechanism, solenoids and cores for actuating the same, means operated by the movable member for controlling the circuits of the solenoids, and resilient means connecting the recording mechanism and the movable member.

6. A measuring instrument comprising a movable member, a recording mechanism, solenoids and cores for actuating the same, means operated by the movable member for controlling the circuits of the solenoids, means for retarding the movements of the recording mechanism, and resilient means connecting the recording mechanism and the movable member.

7. A measuring instrument comprising a movable member, a recording mechanism, an operating lever therefor, resilient means connecting the movable member and the said lever, solenoids and cores for actuating the same, and means operated by the movable member for controlling the circuits of the solenoids.

8. In a measuring instrument, the combination with a movable member and a circuit-interrupting device operated thereby, of a resistance and a condenser in shunt to said interrupting device, recording mechanism and operating solenoids therefor the circuits of which are controlled by said interrupting device.

9. In a measuring instrument, the combination with stationary and movable actuating members and a circuit-interrupting device operated by said movable actuating member, of a resistance and a condenser in shunt to said interrupting device, recording mechanism and operating solenoids the circuits of which are governed by said interrupting device.

10. A measuring instrument comprising a movable member, a parallel-motion beam and lever recording mechanism, solenoids and cores for actuating the same, and means operated by the movable member for controlling the circuits of the solenoids.

11. A measuring instrument comprising a movable member, a parallel-motion beam and lever recording mechanism, solenoids and cores for actuating the same, means operated by the movable member for controlling the circuits of the solenoids, and means coöperating with the solenoid cores for retarding the movements of the recording mechanism.

12. A measuring instrument comprising a movable member, a parallel-motion beam and lever recording mechanism, solenoids and cores for actuating the same, means operated by the movable member for controlling the circuits of the solenoids, and resilient means connecting the movable member and the recording mechanism.

13. In a measuring instrument, the combination with stationary and movable actuating members, of a pair of solenoids, means operated by the movable actuating member to make and break the circuits of said solenoids, a pivotally supported beam provided with a centering weight and connected to the cores of the solenoids, and two pivotally connected levers one of which is provided with a marking device and is pivotally connected to said beam and the other of which is pivotally supported by the instrument frame.

14. In a measuring instrument, the combination with stationary and movable actuating members, of a pair of solenoids, means operated by the movable actuating member to make and break the circuits of said solenoids, a pivotally supported beam provided with a centering weight and connected to the cores of the solenoids, two pivotally connected levers one of which is provided with a marking device and is pivotally connected to said beam and the other of which is pivotally supported by the instrument frame, and a spring between the movable actuating member and the pivotally supported beam.

15. In a measuring instrument, the combination with a movable member, a parallel-motion recording mechanism, solenoids and cores for actuating the same, receptacles for fluid in which the cores operate, and means operated by the movable member for controlling the circuits of the solenoids.

16. A measuring instrument comprising a movable member, a beam pivotally mounted intermediate its ends and provided with a laterally projecting arm, a pair of solenoids, cores therefor carried respectively at opposite ends of the beam, a lever pivotally connected intermediate its ends to the said laterally projecting arm, a link pivotally connected at one end to one end of the said lever, a marking device actuated by the said lever, and means actuated by the movable member to control the circuits of the solenoids.

In testimony whereof, we have hereunto subscribed our names this 22nd day of March, 1906.

FRANK CONRAD.
PAUL MacGAHAN.

Witnesses:
OTTO S. SCHAIRER,
BIRNEY HINES.